Nov. 17, 1959 W. C. KOERBER 2,912,776
AUTOMOTIVE INDICATOR
Filed June 25, 1957 2 Sheets-Sheet 1

INVENTOR.
WILLIAM C. KOERBER
BY
MORGAN, Finnegan, Durham &
Pine
ATTORNEY

Nov. 17, 1959
W. C. KOERBER
2,912,776
AUTOMOTIVE INDICATOR
Filed June 25, 1957
2 Sheets-Sheet 2
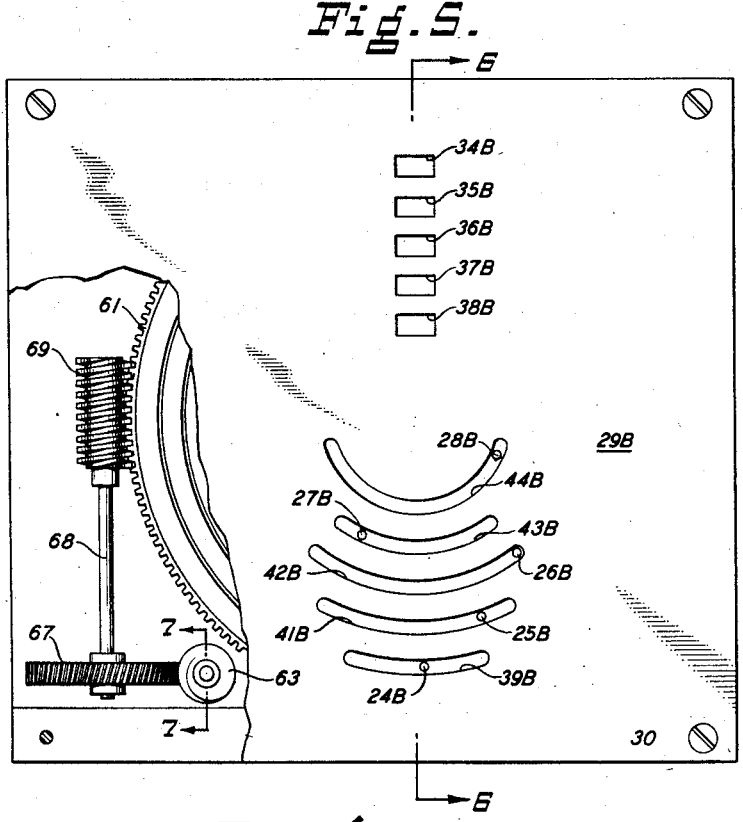
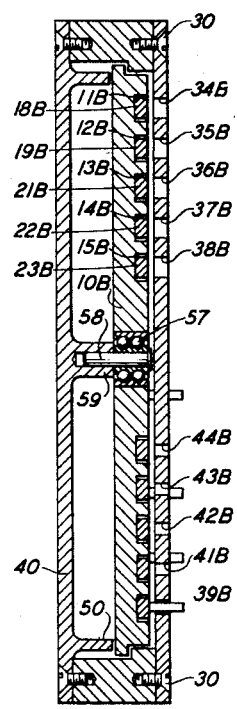
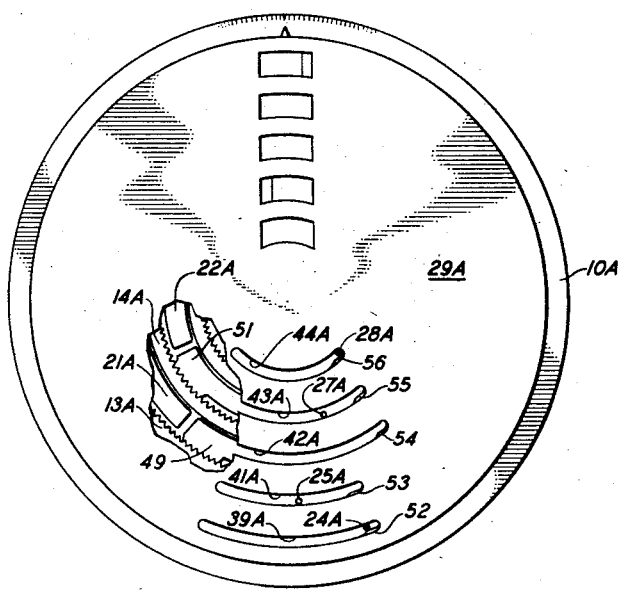
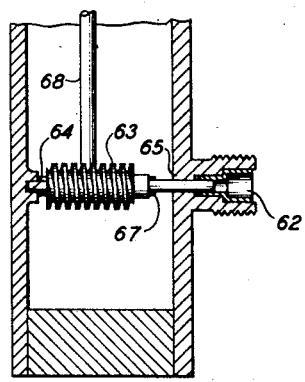
INVENTOR.
WILLIAM C. KOERBER
ATTORNEY

United States Patent Office 2,912,776
Patented Nov. 17, 1959

2,912,776

AUTOMOTIVE INDICATOR

William C. Koerber, New Hyde Park, N.Y.

Application June 25, 1957, Serial No. 667,789

14 Claims. (Cl. 40—70)

The present invention relates to indicating devices and more particularly to an indicator which is especially adapted to be used with an automobile to indicate the time at which various servicing operations should be performed.

The present day automobile operator knows that he must have various servicing requirements performed on his automobile periodically. These service jobs include engine oil change, chassis lubrication, transmission and differential greasing, rotating tires and others. What makes it difficult for the average automobile owner is that these various jobs are not performed after equal mileage increments. For example, it is customary to lubricate the chassis every thousand miles while an engine oil change is required but every two or three thousand miles. Similarly the other service operations that should be performed periodically have different recommended increments of automobile running time between jobs. At the present time there is no convenient and reliable means for indicating to the driver when each of these and other servicing operations must be performed. It is to this general problem that the present invention is directed.

Accordingly it is an object of the present invention to provide a new and improved indicating device to determine when various servicing operations should be performed.

Another object of the present invention is to provide an improved indicating device especially adapted for use with automobiles to indicate when various automobile servicing jobs should be performed.

Another object of the present invention is to provide an indicating device for use with automobiles that is of simple construction readily and inexpensively manufactured and of attractive design.

Another object of the present invention is to provide a small portable indicating device which may be conveniently carried about or located in an automobile for determining when various automobile servicing functions should be performed.

Another object of the present invention is to provide an indicating device which is especially adapted to be installed on the dashboard of an automobile.

Another object of the present invention is to provide an indicating device to indicate when various automobile servicing requirements should be performed and which automatically operates in synchronization with the odometer.

In accordance with these and other objects of the present invention, there is provided an indicating device including a rear disc which is calibrated in miles along the outer periphery thereof. A plurality of flat circular concentric grooves are formed in the disc and receive rings. Each of the rings is located in its respective groove in a snug friction fit so that it will rotate with the back disc. However, the fit between each ring in its groove is such that a small amount of pressure will permit the relative turning of the back disc and rings. A front cover piece fits over the calibrated rear disc and rings and serves to aid in maintaining the rings in their respective grooves.

A plurality of windows are cut in the front section and correspond in number and position to the rings. Thus as the rear disc is rotated, a portion of each ring is observed through its aligned window. In addition, a plurality of arcuate slots equal in number to the rings and aligned therewith are cut in the front section. A stud for resetting purposes is secured to each ring and extends through the arcuate slots. In this manner the rings can be manually rotated relative to the rear disc. Each ring is preferably colored with three different contrasting colors. One color on each ring will indicate to an observer that the job or servicing operation represented by that ring need not yet be done. A second or intermediate color in each ring is a warning color for the observer and indicates that a job represented by that particular ring should be done at this time and a third or danger color indicates to the driver or automobile owner that the particular job is overdue. When a service job represented by a particular ring is completed, the reset stud for that ring is moved to turn the ring relative to the back disc. Thus an automobile owner need only set the mileage scale on the back disc over a pointer and observe the various windows in the front section to determine whether or not a particular servicing job should be done. After the servicing job is completed the associated ring is reset. One modification of the present invention contemplates an installation of such an indicator on the dashboard of an automobile and automatically operated to continuously indicate the servicing condition of the automobile.

The invention will be more fully understood from the following description of a specific embodiment thereof taken with the drawings in which:

Fig. 4 is a modification of the indicator of Fig. 1;

Fig. 5 is a front view partially broken away of a further embodiment of the present invention wherein the indicator is installed on the dashboard of an automobile;

Fig. 6 is a sectional view taken on the line 6—6 of Fig. 5; and

Fig. 7 is a sectional view taken on the line 7—7 of Fig. 5.

Figure 1:
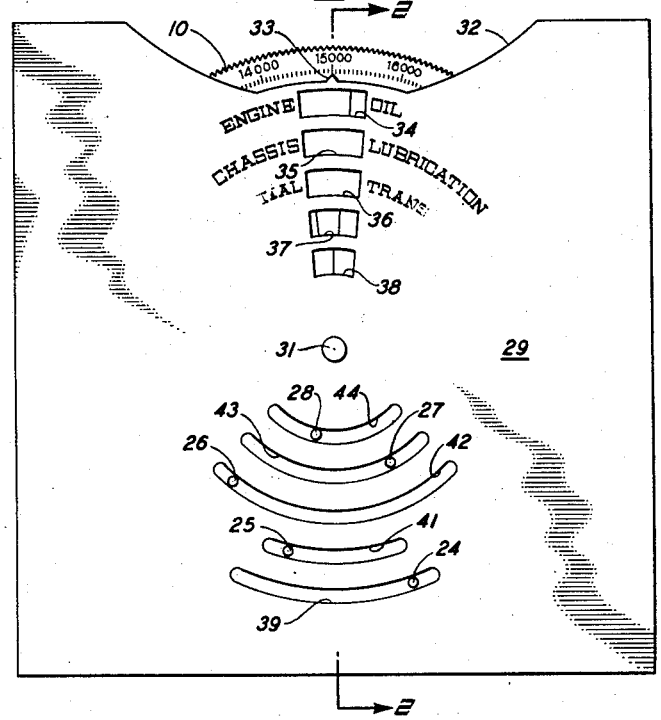
Fig. 1 is a plan view of one embodiment of the indicator of the present invention.
Figure 2:
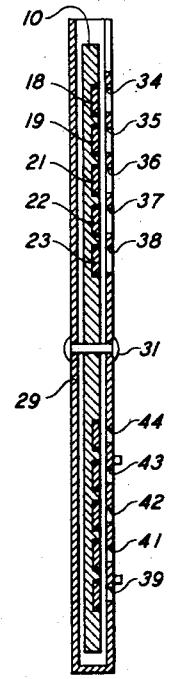
Fig. 2 is a sectional view taken on the line 2—2 of Fig. 1.
Figure 3:
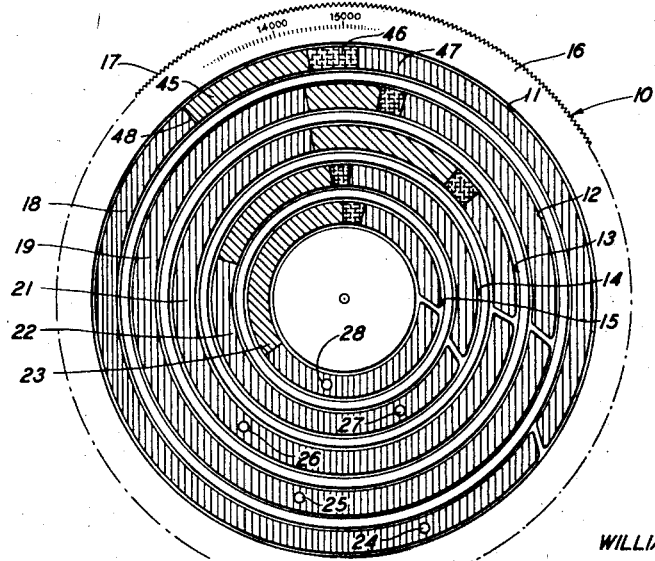
Fig. 3 is a view of the indicator of Fig. 1 with the outer envelope or front section removed showing the rear disc and indicating rings.

Referring now to the drawings and more particularly to Figs. 1, 2 and 3, numeral 10 indicates a circular disc having a plurality of grooves 11, 12, 13, 14 and 15 formed therein. These grooves are concentric with each other and with the circular disc 10. Each groove has a flat bottom and perpendicular sides. The outer periphery 16 of the disc is calibrated in a scale of miles. Any particular scale may be chosen and herein shown, a complete rotation of the disc or 360 degrees represents 25,000 miles. The outer edge of the disc 10 is serrated as at 17 so that the disc may be conveniently manually rotated.

A plurality of rings 18, 19, 21 and 22 and 23 is provided to fit within the grooves 11, 12, 13, 14 and 15 respectively. Each ring has a width slightly less than the width of the groove so that it may be readily inserted therein. The thickness of each ring is approximately equal to the depth of its respective groove. In order to conveniently insert the rings within their respective grooves in a snug friction fit, each ring is split as seen more clearly in Fig. 3. Thus when inserting a ring, it is only necessary to exert a small amount of pressure to squeeze it to a closed position, place it in its respective groove and release it. When the ring is released its outer edge will engage the inner edge of the respective groove. Because of this friction fit, rotation of the disc will result in a corresponding rotation of the rings. However, as will become apparent hereafter a small amount of pressure will permit the rings to rotate relative to the rear disc 10.

Each of the rings is appropriately colored in accordance with the service requirement indicated thereby. Each ring preferably has three colors which for example may be green, yellow and red. The green arc covers an angle approximately equal to the equivalent number of miles of the service requirement indicated thereby and during the observation of this green area the driver knows that it is not yet time for this service requirement. The yellow arc is a warning or intermediate color and may subtend an angle of approximately 15 degrees. The red arc indicates the work represented by the ring is overdue and may be termed the danger area. The rings 18, 19, 21, 22 and 23 are each provided with a reset stud 24, 25, 26, 27 and 28 respectively. Each of the reset studs is secured to its respective ring in any suitable manner and extends perpendicularly upward therefrom. The rear disc 10 with its rings is located within an envelope 29 that may conveniently be formed of a plastic material. The elements are maintained together by means of a rivet or other suitable fastener 31 that passes through the envelope and disc 10.

The upper edge or open side of the envelope is cut down as at 32 to make the mileage scale 16 visible and a pointer projection 33 is formed in the upper envelope edge. In order to observe the indicating rings, a plurality of windows 34, 35, 36, 37, and 38 are cut in the outer surface of the envelope 29. There is also a plurality of reset slots 39, 41, 42, 43 and 44 formed in the face of envelope 29. These arcuate reset slots are concentric and correspond in position to the circular rings. The slots are so positioned that the reset studs 24, 25, 26, 27 and 28 are received therethrough. Since each of the windows 34 through 38 correspond to a particular service requirement, the windows are appropriately labeled as shown in Fig. 1.

In considering the operation of the device we will refer to ring 18 which indicates when an engine oil change should be made. For example, if it is determined that an oil change should be obtained every 2500 miles, the green arc 45 on ring 18 will subtend an angle corresponding to 2500 miles on the scale 16. This will be followed by the yellow warning or intermediate color 46 which may be of approximately 15 degrees. The remaining portion of the ring may be colored red to indicate the work or service job is overdue. As will become apparent hereafter, the portion of the ring 47 after the intermediate color need only be colored an angular distance equal to the width of window 34. The arcuate distance of reset slot 39 is made equal to the sum of green arc 45, yellow arc 46 and the arcuate width of window 34. With the leading edge 48 of disc 18 coinciding with the left-hand edge of window 34, stud 24 is so located as to be positioned at the left-hand corner of reset slot 39.

Thus if it is assumed that an engine oil change has just been made the automobile owner will manually move reset stud 24 to the left or clockwise to the end of reset slot 39. When he does this ring 18 is moved clockwise to a point where the leading edge 48 of the green arc is at the left-hand edge of window 34 and the color green is seen filling this window. If then the disc 10 were moved counterclockwise as the odometer on the automobile increases, it is seen that the ring 18 will also follow this movement. After a period of 2500 miles, the yellow arc 46 will come into view of window 34. If the operator fails to have an engine oil change at this point the disc 10, as it continues to rotate, will bring the red arcuate portion 47 into the view of the window. At this point when the red arc completely fills the window, the reset stud 24 will be located at the right-hand end of reset slot 39. At this time as the disc 10 is turned the ring 18 will remain stationary with respect to envelope 29 because the upstanding stud 24 will not permit further rotation of the ring. Thus the red arc 47 continues to fill the window. If at this point the driver has an engine oil change he will reset ring 18 by manually moving stud 24 clockwise or to the left. When stud 24 is thus placed at the left-hand end of reset slot 39, the beginning of the green arc 45 will appear in window 34. It is readily understood that the other rings 19, 21, 22 and 23 operate in a similar manner to ring 18. However since each of the service operations is to be performed after different or varying increments of mileage, it is necessary to vary the arcuate color areas on the rings and similarly choose the length of each corresponding reset slot in the envelope 29. The proper choice of these arcuate lengths is readily arrived at when it is remembered that the green or safe arc on each ring is substantially equal to the equivalent number of miles of the service requirement as represented in the outer mileage scale chosen and as pointed out above the intermediate color is of any convenient short arc such as about 15 degrees. The remaining portion of each ring need be colored red for just a small portion thereof equal to the width of the respective window. This is true because the remaining portion of each ring will not be viewed since the ring will cease turning when its respective stud reaches the right-hand end of the respective reset slot.

Fig. 4 is another embodiment of the indicator of the present invention. As therein shown the envelope 29 is replaced by a front circular disc 39A which is of a somewhat smaller diameter than the rear disc 10A. Also, in order to insure against any slippage between the rings such as 21A and 22A and the disc 10A, the outer diameter of each groove such as 13A and 14A is toothed as clearly seen in Fig. 4. This toothed or serrated side of each groove will mesh with a portion of the respective indicating ring. Each ring has an enlarged portion at one end thereof, and as shown in Fig. 4 ring 21A has an enlarged portion 49 and ring 22A an enlarged portion 51. Each of these enlarged portions on the five rings is also toothed or serrated to mesh with the serrated grooves. It is readily seen then that with each tooth locked to its respective groove the rings can not slip or slide relative to the indicating disc 10A during rotation thereof. It is recalled from the description of the embodiment shown in Figs. 1 to 3, that when the reset stud of a ring has progressed to the right-hand end of its respective slot, the ring must then move relative to the indicating disc. This is accomplished in the embodiment of Fig. 4 by means of fillets which are located in the right-end corner of each of the reset slots. The slots 39A, 41A, 42A, 43A and 44A each has a fillet 52, 53, 54, 55 and 56 respectively at the right-hand end thereof. Thus if it is considered that the rear disc 10A is turning in a counterclockwise direction, when reset stud 27A, which rides in slot 43A, progress to the right end of the slot, the stud will ride up on the fillet 55 to disengage the toothed portion 51 from the toothed edge of groove 14A. Thus at this point relative rotation between the rings and rear indicating disc is effected so that the third or work overdue color on the ring remains in the window until the service requirement indicated by the ring is performed.

Referring now to the embodiment shown in Figs. 5, 6 and 7, there is shown an indicator of the present invention mounted on the dashboard of an automobile and arranged for continuous, automatic operation in synchronization with the odometer automobile. Numeral 29B indicates the front section of the indicator and may take the form of a plate secured to the automobile dashboard by screws 30. This section has a plurality of aligned windows 34B, 35B, 36B, 37B and 38B cut therein and also reset slots 39B, 41B, 42B, 43B and 44B, similar to the reset slots in the above-described embodiments. An indicating disc 10B may be suitably mounted by means of bearings 57 and shaft 58 to a boss 59 extending forwardly and centrally of the member 40 which also has a forwardly extending flange 50. The disc 10B has grooves 11B, 12B, 13B, 14B and 15B, and corresponding indicating rings 18B, 19B, 20B, 22B and 23B respectively corresponding to the grooves and rings of the above-described embodiments. All of the rings are suitably provided with corresponding reset studs 24B, 25B, 26B, 27B and 28B which ride in the respective reset slots. The outer edge of indicating disc 10B has gear teeth 61 cut therein which serve as a means to rotate the disc as the automobile is driven.

The automobile may be provided with an extra odometer cable 62 which has a worm gear 63 secured at one end thereof. For purposes of the present invention it is unnecessary to describe the driving mechanism for the odometer cable which is conventional and well known. The cable 62 for the indicator of the present invention is driven from the same mechanism that drives the conventional odometer cable in the automobile. The worm gear connected at the end thereof is suitably mounted in bearings 64 and 65 and meshes with a gear 67. This gear is mounted on a shaft 68 to which is connected a second worm gear 69 which in turn meshes with the gear teeth 61 around the outer edge of the indicating disc 10B. It is noted that in this modification it is not necessary to provide a mileage scale such as the scale 16 of Fig. 3. The reason for this is that the automobile odometer will continuously indicate the mileage that the automobile has traveled. It is of course understood that the rings 18B through 23B are colored along arcuate lengths thereof in the same manner as the rings 18 through 23 described above. As recalled from the above description, the lengths of the colored arcs depend upon the particular service represented by each ring and the period measured in miles that the service should be performed. It is seen then that during the operation of the automobile equipped with the indicator of the present invention, the driver need only glance at the windows 34B through 38B to determine when a particular service requirement need be performed. After he has the particular job done, he will reset the appropriate disc by manually moving the respective reset stud 24B through 28B to the left until it contacts the end of its respective reset slot 39B through 44B. It is of course understood that although specific service requirements have been indicated in Fig. 1, such as engine oil change, chassis lubrication, etc., any operation that should be periodically performed after a predetermined number of miles may be recorded by the indicator.

Though this invention has been described with respect to specific embodiments thereof, it is understood that these are not to be considered as limiting the invention as set forth in the following claims.

What is claimed is:

1. An indicating device of the character described comprising a flat disc member, a plurality of circular grooves formed in one face of the disc member, a plurality of rings, each one of said rings located in one of said grooves whereby the rings will rotate integrally with said disc member, a reset stud secured to each ring on the outer face thereof, a face member having a plurality of windows therein, said windows corresponding in number and position to said rings, a plurality of reset slots formed in said face member corresponding in number to said rings, a reset stud of each ring passing through a reset slot whereby each ring can be manually rotated with respect to the disc member.

2. An indicating device of the character described comprising a flat disc member, a plurality of concentric circular grooves formed in one face of the disc member, a plurality of rings, each one of said rings located in one of said grooves in a friction fit whereby the rings will rotate integrally with said disc member, a reset stud secured to each ring on the outer face thereof, a face member having a plurality of windows therein, said disc and face member being relatively rotatable, said windows corresponding in number and position to said rings, a plurality of reset slots formed in said face member corresponding in number to said rings, the reset stud of each ring passing through a reset slot whereby rotation of said disc member causes the rings to rotate until a reset stud reaches the end of the associated reset slot.

3. An automobile service indicating device of the character described comprising a flat rotatable base member, a plurality of concentric circular grooves formed in one face of the base member, a plurality of rings, each one of said rings located in one of said grooves in a pressure fit whereby the rings will rotate integrally with said base member, a reset stud secured to each ring and extending normal to the outer face thereof, a front member having a plurality of windows therein, said windows corresponding in number and position to said rings, each window being labeled with a service requirement, a plurality of reset slots formed in said front member corresponding in number to said rings, a reset stud of each ring passing through a reset slot whereby rotation of said base member causes the rings to rotate until a reset stud reaches the end of the respective reset slot.

4. An indicating device of the character described comprising a flat disc member, a plurality of concentric circular grooves formed in one face of the disc member, a plurality of flat split rings, each one of said rings located in one of said grooves in a spring fit whereby the rings will rotate integrally with said disc member, a reset stud secured to each ring on the outer face thereof, a face member having a plurality of windows therein, said disc and face member being relatively rotatable, said windows corresponding in number and position to said rings, a plurality of reset slots formed in said face member corresponding in number to said rings, the reset stud of each ring passing through a reset slot whereby each ring can be manually rotated with respect to the disc member.

5. A device of the character described for indicating when automobile service jobs should be performed comprising a flat disc member, a plurality of concentric grooves formed in one face of said disc member, a plurality of rings, each one of said rings being located within a respective groove whereby the rings and disc will rotate integrally as a unit, each ring corresponding to an automobile service requirement and having indicia along arcuate lengths thereof, a reset stud secured to each ring on the outer surface thereof, a front member, said disc and front member being relatively rotatable, said front member having a plurality of windows formed therethrough equal in number to the number of said rings, each window being aligned with a respective ring to permit observation thereof, a plurality of reset slots formed in said front member corresponding in number to said rings and aligned therewith, the reset stud of each ring passing through the associated reset slot whereby rotation of said disc member results in rotation of the said rings until a respective reset stud abuts the end of a reset slot at which point the respective ring will remain stationary with respect to the front member, said reset stud being adapted to be manually moved in the respective slot to permit resetting of the associated ring, the indicia on each ring including a first marking having an arcuate length approximately equal to the number of miles for the respective service requirement represented in arcuate distance on said circular disc, a second marking of a predetermined arcuate distance.

6. A device of the character described for indicating when automobile service jobs should be performed comprising a flat circular disc member, a plurality of concentric grooves formed in one face of said disc member, a plurality of rings each of which is adapted to be compressed radially inward, each one of said rings being located within a respective groove whereby the rings and disc will rotate integrally as a unit, each ring corresponding to an automobile service requirement and having indicia along arcuate lengths thereof, the indicia on each ring including a first marking having an arcuate length approximately equal to the number of miles for the respective service requirement represented in arcuate distance on said circular disc, a second marking of a predetermined arcuate distance and a third marking, a reset stud secured to each ring on the outer surface thereof, a front member, said disc and front member being relatively rotatable, said front member having a plurality of radially aligned windows formed therethrough equal in number to the number of said rings, each window being aligned with a respective ring to permit observation thereof, a plurality of arcuate reset slots formed in said front member corresponding in number to said rings and aligned therewith, the reset stud of each ring passing through the associated reset slot whereby rotation of said disc member results in rotation of the rings until a reset stud abuts the end of a reset slot at which point the respective ring will remain stationary with respect to the front member and the said third marking will remain in the respective window, said reset stud being adapted to be manually moved in the respective slot to permit resetting of the associated ring.

7. A device of the character described for indicating when automobile service jobs should be performed comprising a flat circular disc member, a plurality of concentric grooves formed in one face of said disc member, a plurality of split rings each of which is adapted to be compressed radially inward, each of said rings being located within a respective groove in a spring fit whereby the rings and disc will rotate integrally as a unit, each ring corresponding to an automobile service requirement and having indicia along arcuate lengths thereof, the indicia on each ring including a first marking having an arcuate length approximately equal to the number of miles for the respective service requirement represented in arcuate distance on said circular disc, a second marking of a predetermined arcuate distance, a third marking, a reset stud secured to each ring and extending perpendicular to the outer surface thereof, a front member pivotally mounted to the disc member at the center thereof, said front member having a plurality of radially aligned windows formed therethrough equal in number to the number of said rings, each window being aligned with a respective ring to permit observation thereof, the windows having labels alongside thereof indicating various service jobs, a plurality of arcuate reset slots formed in said front member corresponding in number to said rings and aligned therewith, a reset stud of each ring passing through the associated reset slot, each reset slot subtending an arc approximately equal to the arcuate distance of the first marking plus the second marking of the respective ring plus the arcuate width of the corresponding window, said reset stud being adapted to be manually moved in the respective slot to permit resetting of the associated ring.

8. An indicating device of the character described comprising a flat disc member, a plurality of concentric circular grooves formed in one face of the disc member, a plurality of rings, each one of said rings located in one of said grooves in a friction fit whereby the rings will rotate integrally with said disc member, a reset stud secured to each ring on the outer face thereof, an envelope having a face member with a plurality of windows therein, said disc being located within said envelope and pivotally mounted thereto for relative movement, said windows corresponding in number and position to said rings, a plurality of reset slots formed in said face member corresponding in number to said rings, the reset stud of each ring passing through a reset slot whereby rotation of said disc member causes the rings to rotate until a reset stud reaches the end of the associated reset slot.

9. A device of the character described for indicating when automobile service jobs should be performed comprising a flat disc member, a plurality of concentric grooves formed in one face of said disc member, a plurality of rings, each one of said rings being located within a respective groove whereby the rings and disc will rotate integrally as a unit, each ring corresponding to an automobile service requirement and having indicia along arcuate lengths thereof, the indicia on each ring including a first marking having an arcuate length approximately equal to the number of miles for the respective service requirement represented in arcuate distance on said circular disc, a second marking of a predetermined arcuate distance, a reset stud secured to each ring on the outer surface thereof, an envelope having a rear member and a front member, said disc being located within said envelope and pivotally mounted thereto for relative movement, said front member having a plurality of windows formed therethrough equal in number to the number of said rings, each window being aligned with a respective ring to permit observation thereof, a plurality of reset slots formed in said front member corresponding in number to said rings and aligned therewith, the reset stud of each ring passing through the associated slot whereby rotation of said disc member results in rotation of the rings until a respective reset stud abuts the end of a reset slot at which point the respective ring will remain stationary with respect to the front member and the said second marking will remain in the respective window, said reset stud being adapted to be manually moved in the respective slot to permit resetting of the associated ring.

10. A device of the character described for indicating when automobile service jobs should be performed comprising a flat circular disc member, a plurality of concentric grooves formed in one face of said disc member, a plurality of split rings each of which is adapted to be compressed radially inward, each of said rings being located within a respective groove in a spring fit whereby the rings and disc will rotate integrally as a unit, each ring corresponding to an automobile service requirement and having indicia along arcuate lengths thereof, the indicia on each ring including a first marking having an arcuate length approximately equal to the number of miles for the respective service requirement represented in arcuate distance on said circular disc, a second marking of a predetermined arcuate distance and a third marking, a reset stud secured to each ring and extending perpendicular to the outer surface thereof, an envelope having a rear member and a front member, said disc being located within said envelope and pivotally mounted thereto for relative movement, said envelope being cut down along one side thereof to expose a portion of said disc member for manual rotation thereof, said front member having a plurality of radially aligned windows formed therethrough equal in number to the number of said rings, each window being aligned with a respective ring to permit observation thereof, the windows having labels alongside thereof indicating various service jobs, a plurality of arcuate reset slots formed in said front member corresponding in number to said rings and aligned therewith, a reset stud of each ring passing through the associated reset slot, each reset slot subtending an arc approximately equal to the arcuate distance of the first marking plus the second marking of the respective ring plus the arcuate width of the corresponding window, said reset stud being adapted to be manually moved in the respective slot to permit resetting of the associated ring.

11. An indicating device of the character described comprising a flat disc member, a plurality of circular grooves formed in one face of the disc member, the outer edge of each groove being serrated, a plurality of split rings adapted to be compressed radially inward, each ring having a serrated section along the outer edge thereof, said rings being located in respective grooves in said disc member whereby the rings and the disc will rotate integrally as a unit, and whereby the serrated edge of each groove engages with the serrated portion of the respective ring, a reset stud secured to each ring on the outer face thereof, a face member having a plurality of windows therein, said windows corresponding in number and position to said rings, a plurality of reset slots formed in said face member corresponding in number to said rings, a reset stud of each ring passing through a reset slot and means whereby each ring is compressed inwardly to disengage the serrated groove edge and ring portion when the respective stud is at the end of the associated slot to prevent further rotation of the respective ring.

12. An indicator device for an automobile comprising a panel adapted to be mounted on an automobile dashboard, said panel having a plurality of windows therein and a plurality of reset slots corresponding in number to said windows, a disc member rotatably mounted in back of said panel, a plurality of concentric circular grooves formed in the forward face of the disc member, a plurality of rings, each one of said rings being located within a respective groove whereby the rings and disc will rotate integrally as a unit, each ring corresponding to an automobile service requirement and having indicia along arcuate lengths thereof, a reset stud secured to each ring on the outer surface thereof, the reset stud of each ring passing through a reset slot in said panel and each ring being aligned with a respective panel window for observation thereof and means to rotate said disc member.

13. An indicator device for an automobile comprising a panel adapted to be mounted on an automobile dashboard, said panel having a plurality of windows therein and a plurality of reset slots corresponding in number to said windows, a disc member rotatably mounted in back of said panel, a plurality of concentric circular grooves formed in the forward face of the disc member, a plurality of split rings, each one of said rings being located within a respective groove whereby the rings and disc will rotate integrally as a unit, each ring corresponding to an automobile service requirement and having indicia along arcuate lengths thereof, a reset stud secured to each ring on the outer surface thereof, the reset stud of each ring passing through a reset slot in said panel and each ring being aligned with a respective panel window for observation thereof, means to rotate said disc member, said last-named means comprising a cable having a rotatable core connected to rotate in synchronization with the running of the automobile, gearing means connecting said rotatable cable core and said disc.

14. An indicator device for an automobile comprising a panel adapted to be mounted on an automobile dashboard, said panel having a plurality of windows therein and a plurality of reset slots corresponding in number to said windows, a disc member rotatably mounted in back of said panel, a plurality of concentric circular grooves formed in the forward face of the disc member, a plurality of split rings, each one of said rings being located within a respective groove whereby the rings and disc will rotate integrally as a unit, each ring corresponding to an automobile service requirement and having indicia along arcuate lengths thereof, a reset stud secured to each ring on the outer surface thereof, the reset stud of each ring passing through a reset slot in said panel and each ring being aligned with a respective panel window for observation thereof, means to rotate said disc member, said last-named means comprising a cable having a rotatable core connected to rotate in synchronization with the running of the automobile, gearing means connecting said rotatable cable core and said disc, the indicia on each ring including a first marking having an arcuate length approximately equal to the number of miles for the respective service requirement as represented in arcuate distance on said circular disc.

References Cited in the file of this patent

UNITED STATES PATENTS

| | | |
|---|---|---|
| 973,638 | Dorsey | Oct. 25, 1910 |
| 1,040,345 | Jones | Oct. 8, 1912 |
| 1,119,959 | Higginbottom | Dec. 8, 1914 |
| 1,883,037 | Snook | Oct. 18, 1932 |
| 1,891,335 | Reisinger | Dec. 20, 1932 |
| 2,246,633 | Lawlor | June 24, 1941 |

FOREIGN PATENTS

| | | |
|---|---|---|
| 825,913 | Germany | Dec. 27, 1951 |